United States Patent [19]

Biagiotti

[11] Patent Number: 5,433,817
[45] Date of Patent: Jul. 18, 1995

[54] PLY-BONDING DEVICE FOR BONDING PLIES OF PAPER WEBS AND LIKE MATERIAL

[75] Inventor: Guglielmo Biagiotti, Via Di Vorno, Italy

[73] Assignee: Fabio Perini S.p.A., Luca, Italy

[21] Appl. No.: 128,547

[22] Filed: Sep. 30, 1993

[51] Int. Cl.⁶ ............................................. B32B 31/04
[52] U.S. Cl. .................... 156/553; 156/209; 156/582; 264/284; 425/367
[58] Field of Search ............... 156/209, 553, 582, 470, 156/471, 472; 264/284; 100/93 RP; 425/367, 369, 336

[56] References Cited

U.S. PATENT DOCUMENTS

| | | |
|---|---|---|
| 3,730,080 | 5/1973 | Deligt . |
| 3,731,620 | 5/1973 | Klemmer . |
| 3,749,622 | 7/1973 | Suto et al. ............ 156/533 X |
| 3,876,872 | 2/1975 | Nystrand . |
| 4,110,152 | 8/1978 | Dunning et al. . |
| 4,400,227 | 8/1983 | Riemersma ........... 156/582 X |
| 4,420,680 | 12/1983 | Itoh ....................... 156/582 X |
| 4,531,996 | 7/1985 | Sufenik ................ 156/472 |
| 4,556,527 | 12/1985 | Sarcander ............ 264/171 |
| 4,721,592 | 1/1988 | Fruehauf et al. ...... 264/284 X |
| 4,818,330 | 4/1989 | Mosburger ........... 156/582 X |

FOREIGN PATENT DOCUMENTS

| | | |
|---|---|---|
| 0107787 | 5/1984 | European Pat. Off. . |
| 0370972 | 5/1990 | European Pat. Off. . |
| 1179747 | 1/1970 | United Kingdom . |
| 9311929 | 6/1993 | WIPO . |

OTHER PUBLICATIONS

European Patent Office Search Report on EP 93 83 0373.

*Primary Examiner*—Mark A. Osele
*Attorney, Agent, or Firm*—Francis J. Bouda

[57] ABSTRACT

The ply-bonding device for paper converting machines comprises a support 1,5 to which a movable unit 15 is pivoted. The movable unit is provided with a pressure wheel 19 which cooperates with a counter-roller 2, and a pressure means 31 which forces said wheel 19 against the counter-roller 2. The wheel 19 is resiliently supported on movable unit 15 and, during operation the position of the unit is defined by an abutment 37 on the support 1,5. (FIG. 1).

11 Claims, 2 Drawing Sheets

PLY-BONDING DEVICE FOR BONDING PLIES OF PAPER WEBS AND LIKE MATERIAL

BACKGROUND OF THE INVENTION

The invention refers to a ply-bonding device for paper converting or similar machines, which includes a fixed support to which a movable unit is pivoted, said movable unit being provided with a pressure wheel which cooperates with a counter-roller, and a pressure means which forces said wheel against the counter-roller.

The wheel has knurled surfaces which cooperate with the smooth surface of the counter-roller (or vice-versa). A multiply paper web or similar material passes between the wheel and the counter-roller where the plies are bonded together by the high localized pressure between the protruding parts of the wheel and counter-roller. The wheel is urged against the counter-roller by a plenum chamber located between the fixed support and the pressure wheel bearing unit. The plenum chamber is inflated at a high pressure and pushes the wheel against the surface of the counter-roller. A number of ply-bonding units are disposed in side-by-side relationship along the axis of the counter-roller, each being provided with its own pressure wheel and all being urged by a single pressurized plenum chamber. The presence of a plurality of wheels, each provided with an independent movable unit hinged to the support structure, allows for spaced areas of ply-bonding on the multi-ply web between the pressure wheels and the counter-roller surface which may not be in a straight line because of flexural deformation of the counter-roller axis.

According to the prior devices, articulation between a stationary support and a movable unit is accomplished by a ball joint which, by ensuring more degrees of freedom, makes it possible to compensate for any lack of parallelism between the axis of the pressure wheel and the axis of the counter-roller.

Such mobility of the wheel-carrying unit with respect to the counter-roller is necessary, but it brings about a considerable problem inasmuch as the unit and the wheel may vibrate and also because paper particles tend to accumulate on said wheels. The vibrating mass is extremely large and the consequent dynamic loads on the counter-roller may lead to a rapid wear and to a damage of the wheel. This is a significant problem, especially when considering the high cost of such elements and, above all, the loss of production while the elements are being replaced.

The present invention provides a new ply-bonding group which, by ensuring individual adaptation of each wheel to the cylindrical surface of the counter-roller (even if the counter-roller is deformed), is able to drastically reduce the dynamic loads caused by vibration.

According to the invention, the pressure wheels are resiliently supported on the movable unit and the latter, under operating condition, has a pre-determined stationary position defined by a rigid abutment against the support to which it is hinged.

With this arrangement, the resiliency of the wheel support on the unit allows said wheel to conform to the cylindrical surface of the counter-roller, while the movable unit is rigidly supported and, therefore, does not enter into vibration. The resiliency of the wheel relative to its support on the unit allows its surface to adapt to the surface of the counter-roller, which may bend or flex under load. Thus the mass which vibrates is only the wheel mass (or a fraction thereof).

In a particularly advantageous embodiment of the invention, the wheel includes an outer cylindrical sleeve on which the knurled surface, cooperating with the counter-roller surface, is formed. Such outer cylindrical sleeve is, in turn, mounted on an inner resilient sleeve which is between the central core of the wheel and the outer sleeve. The inner resilient sleeve interposed between the knurled outer sleeve and the central core allows additional adaptation, and the mass, which may possibly vibrate, is, in this case, only that of the knurled outer cylindrical sleeve and, therefore, is even less than the mass of the whole wheel. The inner resilient sleeve may be made of rubber and, in this case, it provides an additional vibration-damping effect.

The wheel-carrying movable unit which, by this arrangement, is hinged to the support with only very limited movement (i.e., with only the possibility of rotating about an axis parallel to the axis of rotation of the wheel) also has a rigid extension carrying at its end a stop means arranged to contact a portion of the support of the unit.

The stop means may be suitably adjustable.

Under operating conditions, the wheel-carrying movable unit is pushed by the pressurized plenum chamber to a fixed position determined by cooperation between the stop means and the support. This forms a rigid mechanical system.

With the above and other objects in view, more information and a better understanding of the present invention may be achieved by reference to the following detailed description.

DETAILED DESCRIPTION

For the purpose of illustrating the invention, there is shown in the accompanying drawings a form thereof which is at present preferred, although it is to be understood that the several instrumentalities of which the invention consists can be variously arranged and organized and that the invention is not limited to the precise arrangements and organizations of the instrumentalities as herein shown and described.

In the drawings, wherein like reference characters indicate like parts:

Figure 1:
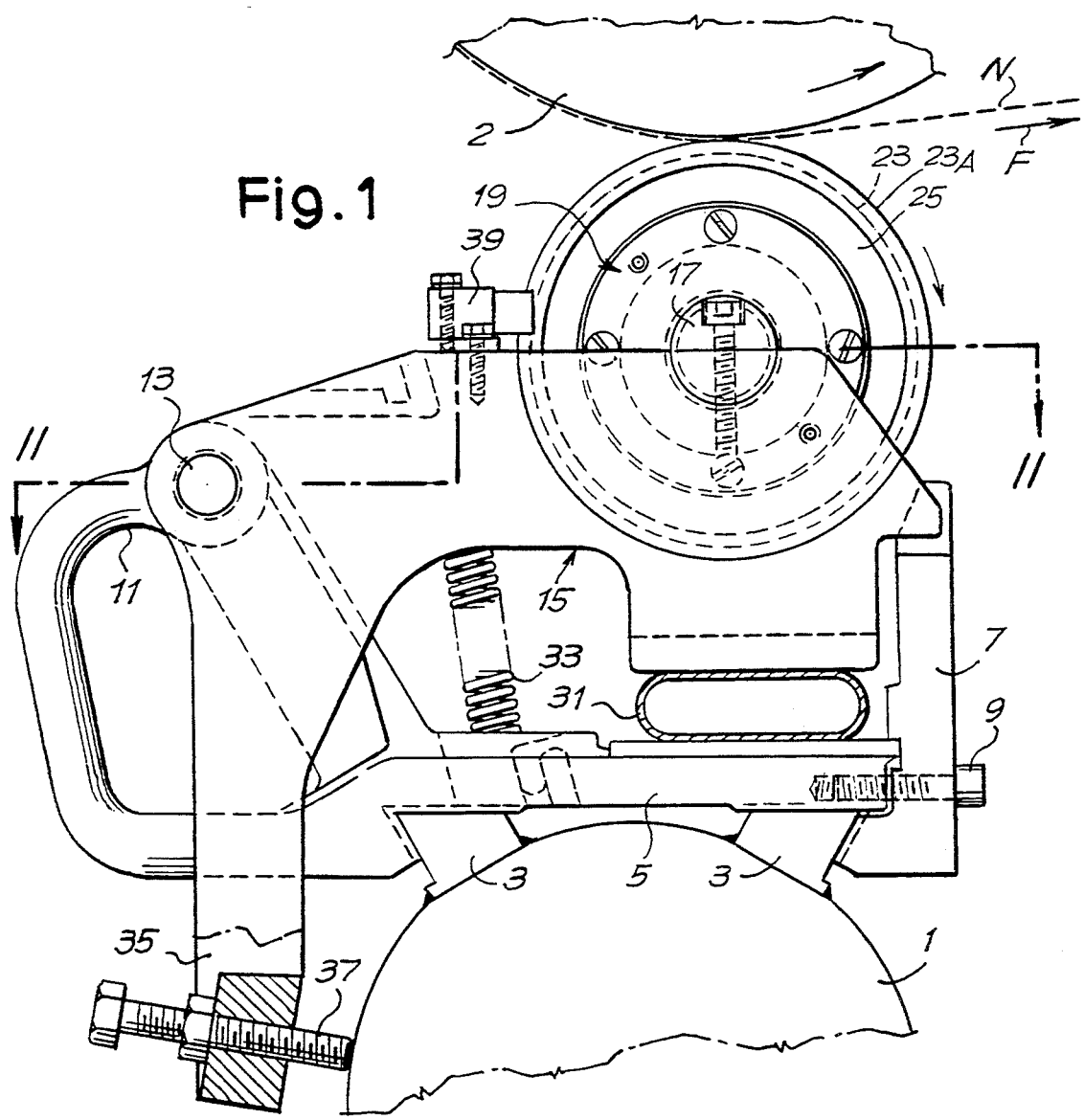
FIG. 1 shows a side view of one embodiment of the ply-bonding device of the invention.
Figure 2:
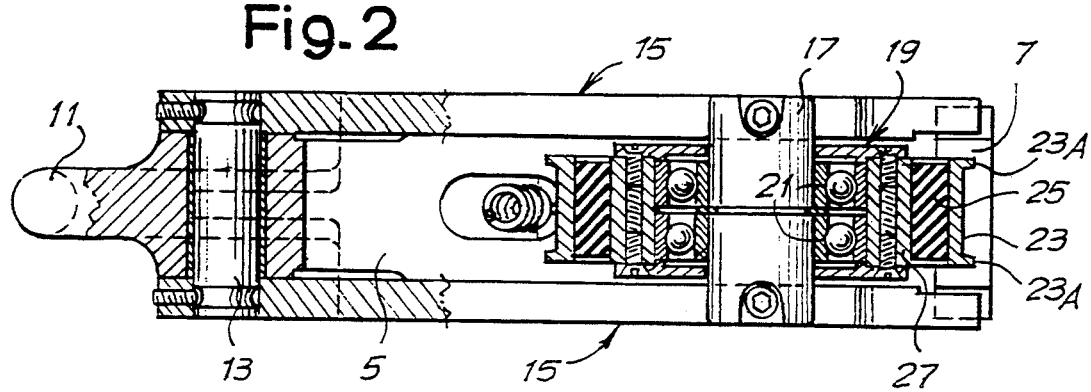
FIG. 2 shows a section taken on line II—II of FIG. 1.

With reference to FIGS. 1 and 2, numeral 1 indicates a beam having a circular cross-section and which extends transversely across the width of the machine in which the ply-bonding device is placed. The axis of beam 1 is parallel to the axis of a counter-roller 2 on which a paper web material N is supported and moves forward in the direction of arrow F. On the beam 1 are dovetail guides 3 which carry support plates 5. On the beam 1 there are mounted a plurality of such spaced-apart plates 5 which are parallel to each other and support a plurality of wheels 19, each cooperating with the counter-roller 2. Each plate 5 is securely fastened to the guides 3 by a bracket 7 and screw member 9. The plate 5 has an operable handle 11 with a journal 13 mounted thereon for pivotally supporting a movable unit generally indicated by 15.

Mounted on the movable unit 15 is a further journal 17 carrying a wheel 19 supported by bearings 21. The wheel 19 is formed with an outer cylindrical sleeve 23 on which an active knurled surface 23A is formed, to cooperate with the smooth surface of the counter-roller 2. The knurled cylindrical sleeve 23 is mounted on the core or hub 27 of the wheel with a resilient sleeve 25 between it and the hub. The resilient sleeve 25 allows relative movement of the knurled sleeve 23 with respect to the hub 27 of the wheel 19.

Between the support plate 5 and the movable unit 15 which pivots in journal 13 is a pressure means represented by a plenum chamber 31 that may be inflated at high pressure. The plenum chamber 31 urges the movable unit 15, and thus the wheel 19, against the cylindrical surface of the counter-roller 2 in order to ply-bond the web N passing between the wheel 19 and the counter-roller 2. A tension spring 33 always keeps the unit 15 in inoperative position against the plenum chamber, even if the device is mounted in an inverted position with respect to that shown in FIG. 1, i.e., if the wheel 19 and the counter-roller 2 are below the beam 1.

The movable unit 15 is further provided with an arm 35 carrying at its end an adjustable stop means 37. The stop means 37 rests against the surface of the beam 1. In the condition illustrated in FIG. 1, the plenum chamber 31 is inflated. The inflation pressure inside the plenum is considerably higher than that necessary for the good operation of the wheel 19 pressing against the surface of the counter-roller 2. Under these conditions, the force exerted by the plenum chamber ensures that the stop means 37 rests firmly against the beam 1 to ensure a stable position of the whole movable unit 15. The adjustment of each stop means 37 makes it possible to adjust the force with which the sleeve 23 of the wheel 19 acts upon the paper. Possible variation in the surface of the counter-roller 2 are compensated for by the resilient sleeve 25 and thus only by a movement of the mass represented by the cylindrical outer knurled sleeve 23 of the wheel 19. This reduces drastically the dynamic loads on the whole system, thereby increasing the life of the various components.

Mounted on the unit 15 is a brush 39 which keeps the surface of the wheel 19 clean.

Figure 3:
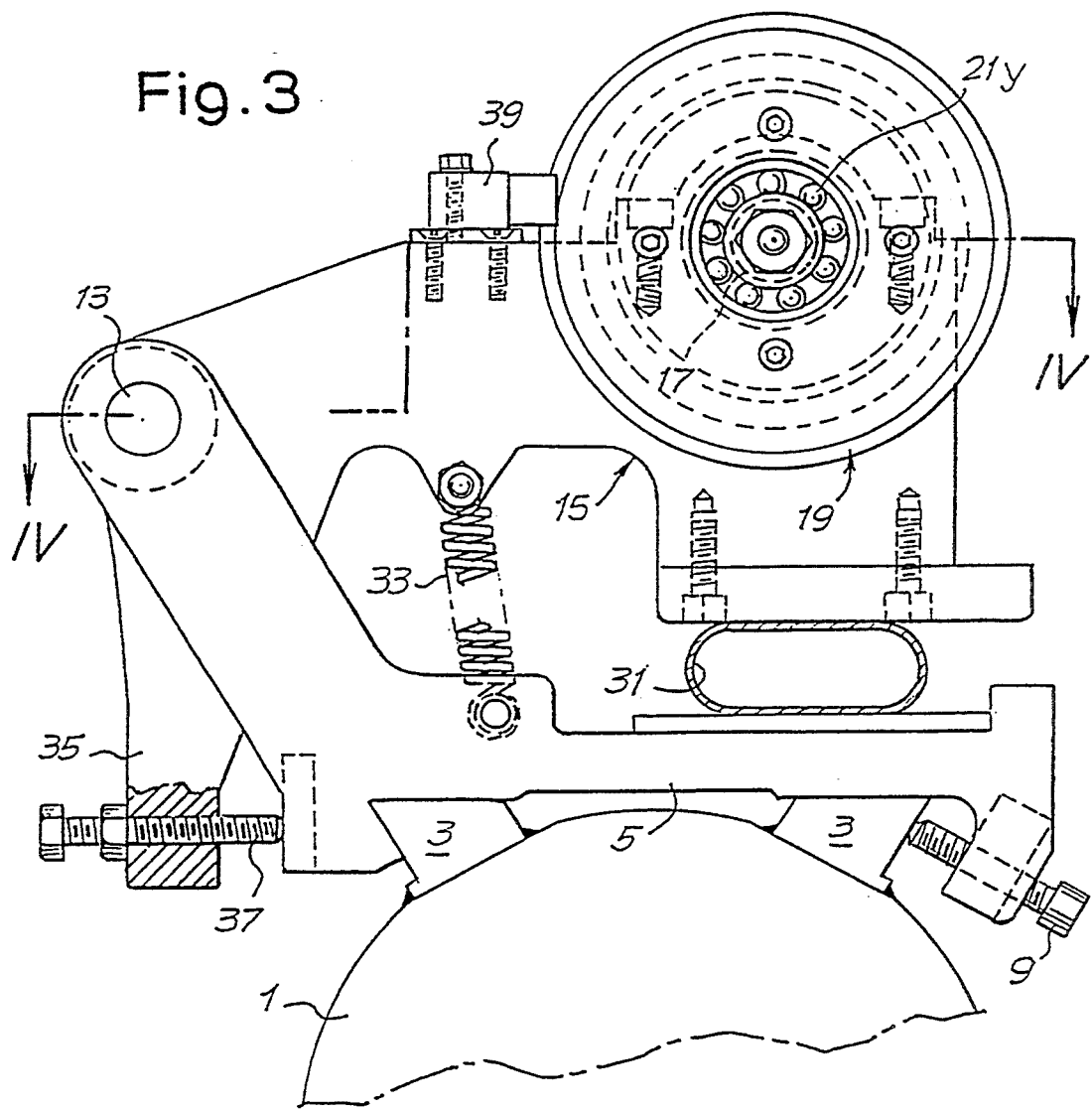
FIG. 3 shows a side view similar to FIG. 1 of another embodiment of the ply-bonding device in the present invention.
Figure 4:
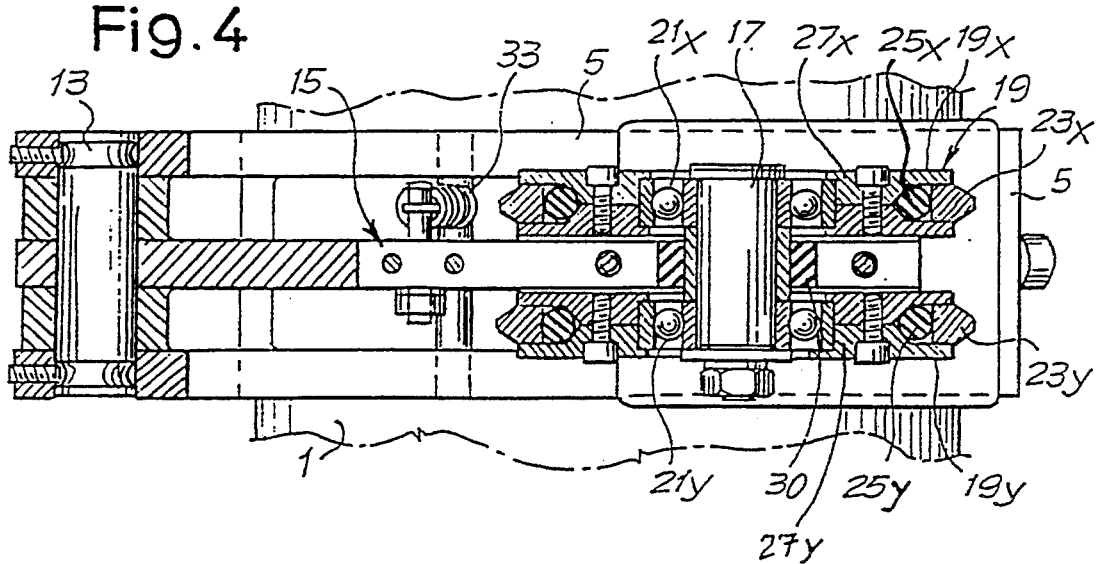
FIG. 4 shows a section taken on line IV—IV of FIG. 3.

FIGS. 3 and 4 show another embodiment of the apparatus according to the invention. Like numbers indicate corresponding parts of the embodiment shown in FIGS. 1 and 2. The main difference between the embodiment of FIGS. 3 and 4 and the one of FIGS. 1 and 2 is to be seen in the configuration of the wheel 19. As clearly shown in FIG. 4, the wheel 19 is made up of two parts 19X, 19Y, each of which has a hub or core 27X, 27Y, respectively, on which a relevant outer annular knurled sleeve 23X, 23Y is mounted. Each core 27X, 27Y is supported by a relevant bearing 21X, 21Y on the journal 17. Disposed between each core 27X, 27Y and the relevant annular sleeve 23X, 23Y is a resilient sleeve 25X, 25Y, which (like the block 25 of FIG. 2) allows the relevant outer knurled annular sleeve to vibrate with respect to the journal 17.

In addition, the wheel 19, with respective journal 17, may be mounted on the movable unit 15 with the interposition of a rubber bushing 30 allowing a further movement of the wheel 19 with respect to the unit 15. This disposition allows each wheel portion 19X, 19Y to vibrate independently, with a corresponding reduction of the vibrating mass in case only one of the two portions is subject to dynamic loads. Besides, the rubber bushing 30 allows the whole group made up of wheel 19 and journal 17 to vibrate, independently of the unit 15, which remains firmly in position with respect to the beam 1.

It is understood that the drawing shows an exemplification given only as a practical demonstration of the invention, as this may vary in the forms and dispositions without nevertheless coming out from the scope of the idea on which the same invention is based. The possible presence of reference numbers in the appended claims has the purpose of facilitating the reading of the claims, reference being made to the description and the drawing, and does not limit the scope of the protection represented by the claims.

I claim:

1. Ply-bonding device for a paper converting machine, including:
    a counter-roller (2),
    a rigid support (1, 5),
    a movable unit (15) hinged to said rigid support (1, 5),
    a pressure wheel (19) supported on said movable unit (15), said pressure wheel including a rigid outer sleeve (23; 23X, 23Y) which is forced against said counter-roller (2),
    a pressure means (31) which forces said pressure wheel (19) against said counter-roller (2),
wherein said movable unit (15) is provided with a rigid abutment (37), cooperating with the rigid support (1, 5), wherein said pressure wheel (19) is resiliently supported on said movable unit (15),
and wherein said pressure means (31) forces said movable unit (15) against said rigid support (1, 5), such that said movable unit (15) rigidly abuts against said rigid support (1, 5), and further forces said pressure wheel (19) against said counter-roller (2), the outer sleeve (23; 23X, 23Y) of said pressure wheel (19) being free to vibrate with respect to said movable unit (15), which rigidly abuts against said rigid support (1, 5).

2. Ply-bonding device according to claim 1, characterized in that the pressure wheel (19) includes a core (27; 27X, 27Y) and an outer annular sleeve (23; 23X, 23Y) having a surface (23A) which acts against the counter-roller (2), and including a resilient sleeve element (25; 25X, 25Y) disposed between said outer sleeve and said core.

3. Ply-bonding device according to claim 2, characterized in that said resilient sleeve is a rubber ring.

4. Ply-bonding device according to any one of claims 1, 2 or 3, characterized in that the movable unit (15) is articulated to the support (1, 5) through a hinge (13) allowing a swinging motion about only one axis.

5. Ply-bonding device according to any one of claims 1, 2 or 3, characterized in that the unit (15) has a rigid arm (35) which carries at its end the abutment (37) which cooperates with the support (1, 5).

6. Ply-bonding device according to any one of claims 1, 2 or 3, characterized in that the abutment (37) is adjustable to define various angular work positions of the wheel-carrying mobile unit (15) and thus the operating pressure of the wheel (19) against the counter-roller 2.

7. The ply-bonding device of claim 1 wherein said movable unit includes non-vibrating suports, a hub on said supports, and said rigid outer sleeve comprising a knurled ring carried by said hub, so that only said ring will vibrate with respect to said counter-roller.

8. The unit of claim 7 which includes at least one resilient sleeve between the ring and the hub.

9. Ply-bonding device for a paper converting machine, including:
   a counter-roller (2),
   a rigid support (1, 5),
   a movable unit (15) hinged to said rigid support (1, 5),
   a pressure wheel (19) supported on said movable unit (15), said pressure wheel including a rigid outer sleeve (23; 23X, 23Y) which is forced against said counter-roller (2),
   a pressure means (31) which forces said pressure wheel (19) against said counter-roller (2),
   wherein said movable unit (15) is provided with a rigid abutment (37), cooperating with the rigid support (1, 5),
   wherein said pressure wheel (19) is resiliently supported on said movable unit (15),
   and wherein said pressure means (31) forces said movable unit (15) against said rigid support (1, 5), such that said movable unit (15) rigidly abuts against said rigid support (1, 5), and further forces said pressure wheel (19) against said counter-roller (2), the outer sleeve (23; 23X, 23Y) of said pressure wheel (19) being free to vibrate with respect to said movable unit (15), which rigidly abuts against said rigid support (1, 5) and further characterized in that the wheel (19) is made up of two portions (19X, 19Y), each portion comprising a core or hub (27X, 27Y) on which a relevant outer annular sleeve (23X, 23Y) is disposed with the interposition of a respective resilient sleeve (25X, 25Y) therebetween.

10. Ply-bonding device for a paper converting machine, including:
    a counter-roller (2),
    a rigid support (1, 5),
    a movable unit (15) hinged to said rigid support (1, 5),
    a pressure wheel (19) supported on said movable unit (15), said pressure wheel including a rigid outer sleeve (23; 23X, 23Y) which is forced against said counter-roller (2),
    a pressure means (31) which forces said pressure wheel (19) against said counter-roller
    wherein said movable unit (15) is provided with a rigid abutment (37), cooperating with the rigid support (1, 5),
    wherein said pressure wheel (19) is resiliently supported on said movable unit (15),
    and wherein said pressure means (31) forces said movable unit (15) against said rigid support (1, 5), such that said movable unit (15) rigidly abuts against said rigid support (1, 5), and further forces said pressure wheel (19) against said counter-roller (2), the outer sleeve (23; 23X, 23Y) of said pressure wheel (19) being free to vibrate with respect to said movable unit (15), which rigidly abuts against said rigid support (1, 5) and further characterized in that the wheel (19) is made up of two portions (19X, 19Y), each portion comprising a core or hub (27X, 27Y) on which a relevant outer annular sleeve (23X, 23Y) is disposed with the interposition of a respective resilient sleeve (25X, 25Y) therebetween and further characterized in that the two portions (19X, 19Y) of the wheel (19) are supported by a journal (17) which is mounted on the movable unit (15) with the interposition of a resilient bushing (30) therebetween.

11. A unit for bonding a multi-ply web of paper as it is supported on a counter-roller of a paper-converting machine, said unit including non-vibrating supports, a hub on said supports, a knurled ring carried by said hub, so that only said ring will vibrate, and wherein said knurled ring is a 2-piece member, each of which member is capable of vibrating independently of each other, of the respective hub and of the supports.

* * * * *